Sept. 27, 1955     I. E. NUTTER     2,718,900

VALVE MECHANISM FOR FLUID AND LIQUID CONTACT APPARATUS

Filed March 3, 1952     5 Sheets-Sheet 1

INVENTOR
IRVIN E. NUTTER

BY *Cushman Darby Cushman*

ATTORNEYS

Sept. 27, 1955     I. E. NUTTER     2,718,900
VALVE MECHANISM FOR FLUID AND LIQUID CONTACT APPARATUS
Filed March 3, 1952     5 Sheets-Sheet 2

INVENTOR
IRVIN E. NUTTER

BY *Cushman, Darby & Cushman*
ATTORNEYS

*INVENTOR.*
IRVIN E. NUTTER

United States Patent Office 2,718,900
Patented Sept. 27, 1955

2,718,900

VALVE MECHANISM FOR FLUID AND LIQUID CONTACT APPARATUS

Irvin Earl Nutter, Amarillo, Tex., assignor of one-half to Martha C. Nutter, Potter County, Tex.

Application March 3, 1952, Serial No. 274,524

21 Claims. (Cl. 137—512.1)

The present invention relates to a gaseous and liquid contact apparatus and more particularly to an improved bubble tray for a bubble tower or the like for producing uniform distribution of the flow of gas or vapor through a plurality of flow passages so as to insure intimate contact and thorough mixing of the gas or vapor with the liquid.

The bubble tower is an important part of a fractionation, absorption, distillation, and other systems by means of which gas or vapor and liquid materials are separated, recovered, refined or purified by the accomplishment of continuous multiple distillation with counterflow of the gas or vapor and liquid materials. Bubble towers are also used in extraction processes to leach out an impurity by one of the materials from the other.

An important object is to provide simple, efficient and economical means for automatically regulating the areas of the flow passages through bubble trays in accordance with differential ranges of pressure across bubble trays. The means for automatically varying the areas for producing uniform distribution, of the flow of gas or vapor through a wide range of capacity, is more advantageous than with fixed areas, for the flow of gas or vapors through a narrow range of capacity, of conventional means including bubble caps and their accompanying chimneys. Upon the establishment of some fixed minimum desirable differential of pressure across the bubble tray, approximately one-half of the ultimate permissible area of opening of the device is brought into operation. As this pressure differential is moderately increased, beyond this minimum, additional rates of flow are automatically accomplished dependent upon the demands for flow rates till finally at some established pressure differential increase the remaining or other half of the ultimate permissible area starts opening. At this point, and with the initial half remaining open, the second or other half starts throttling additional rates of flow without any further appreciable increase in pressure differential as flow rates increase to the point where the second half or remaining portion is wide open. When both sides become wide open further rates of flow are accomplished as the pressure differential continues to increase. The head of liquid or submergence of the different units or bubble caps on a bubble tray is variable as a result of the head of liquid on the entrance side of the tray being higher than on the exit side to effect flow across the tray, the bubble tray not being level, unevenness of the flow of liquid across the tray resulting from uneven distribution of liquid by the entrance weir, or any combination of these conditions. In the operation of bubble trays, equipped with conventional means including bubble caps and their accompanying chimneys, the units or bubble caps submerged or surrounded by the lower level of liquid will take substantially all of the gas or vapor, leaving the other units or bubble caps inoperative. This operation of conventionally equipped bubble trays is particularly characteristic when operating at any capacities less than moderately below design capacity. In such operation, with the head of liquid on the entrance side of the tray being higher than on the exit side to effect flow across the tray, as is generally the case, the units or bubble caps nearest the liquid exit side start taking all of the gas or vapors which in turn partially impounds the flow of liquid across the tray and causes the head of liquid to become even higher over the remainder of the tray than before the flow of gas or vapor started. As increased rates of gas or vapor flow continue additional units or bubble caps come into operation from the liquid exit towards the liquid entrance side of the tray until finally at designed operating capacity all units or bubble caps are in operation. The head of liquid is the greatest resistance to the flow of gas or vapor, in bubble trays equipped with conventional units or bubble caps, and until the rate of flow is of sufficient magnitude to become resisted also, by the provided areas for gas or vapor passage, in a proportion equal to or in excess of the differences in liquid head throughout the entire area of the bubble tray, the flow of gas or vapor seeks the path of least resistance and functions as heretofore described. In the present invention resistance to gas or vapor flow, in excess of anticipated differences in liquid head over the tray, must be overcome in addition to the liquid head on the bubble tray before any area through the bubble tray is exposed for the passage of gas or vapor. Accordingly, the improved bubble trays so function that any effect of differences in liquid head among the different flow passages on the bubble tray is almost eliminated before gas or vapor flow at any practicable minimum operating rate starts. For this reason no perceptible unevenness in distribution of gas or vapor exists when the minimum desirable gas or vapor flow commences. Thus, as the rate of gas or vapor flow progresses and the liquid surrounding the flow passages loses its density, the difference in liquid head among the different flow passages on the bubble tray is infinitely further reduced, percentagewise, to where, for all practical purposes, the liquid head among the different flow passages on the entire bubble tray becomes the same.

More particularly, in carrying out the present invention, there is provided over each opening or a plurality of openings, which preferably may be arranged in rows on the bubble tray, flow controlling means preferably in the form of one or more floating pivoted valves that normally close the bubble tray or flow passages, but which are automatically moved against the force of gravity to open the flow passages with the area thereof opening about half way at some minimum differential and throttling the remaining way open, through a narrow range of differential change, at some increased differential pressure with the volumes of gas or vapor passage increasing with respect to the area of opening and differential pressure across the tray through the openings or flow passages. By automatic individual regulation of the area of each or a plurality of flow passages and accompanying flow controlling means in the foregoing manner, equalized flow of gas or vapor is procured amongst the plurality of openings in each of the bubble trays of the tower. All the flow passages being under the direct confine of the floating pivoted valves, are in a substantially half-open position appreciably before the differential pressure has increased sufficiently to start throttling the remaining distance open by which time the density of liquid surrounding the flow passages or tray openings has become so thoroughly equalized, by the bubbling action, that this secondary opening in a throttling fashion is in unison and of uniform magnitude with all the other tray openings and their respective flow controlling valves or members.

Heretofore, bubble caps and chimneys at best provide only a lazy contact of gas or vapor with the liquid surrounding the bubble caps, so that only relatively large bubbles of gas or vapor travel through the liquid and afford relatively small surface areas for contact between the gas or vapor and the liquid.

Accordingly, the present invention provides means for laterally jetting the gas or vapor into the liquid at relatively high velocity, thus causing the gas or vapor to break up into very fine bubbles upon entry into the liquid as is manifest by the large quantity of froth produced over the bubble tray. By comparison under identical conditions, practically no froth, if any, is produced over a bubble tray equipped with bubble caps and chimneys, which instead produce more of a violent agitation with droplets of liquid being thrown high above the surface of the bubble tray by the breaking up of the large bubbles emitted from the bubble caps.

A further object is to provide a gas or vapor and liquid contact apparatus in which each tray plate has gas or vapor openings or flow passages, and on which floating pivoted valves are positioned above the openings and arranged to close same. Each floating pivoted valve is provided with a light side and an opposite heavy side and normally is maintained in engagement with the tray to close the opening or flow passage and is operable upon variation in the differential gas or vapor pressure from below the tray to above the same, so as to be initially rocked or moved about its heavy side as a fulcrum so as to raise the opposite light side or edge away from the flow opening, and, upon increase of the upward gas or vapor pressure on the underside of the tray, to be bodily moved away from said opening upon being finally rocked or moved about its light side as a fulcrum so as to raise the opposite or heavy edge also away from the flow opening so as to allow the full or complete flow of the gas or vapor therethrough.

In the specification and claims the term "gas" is intended to include gases and vapors and the term "vapor" includes gases and vapors.

Referring to the drawings in which are shown several preferred embodiments, the invention may assume.

Figure 1:
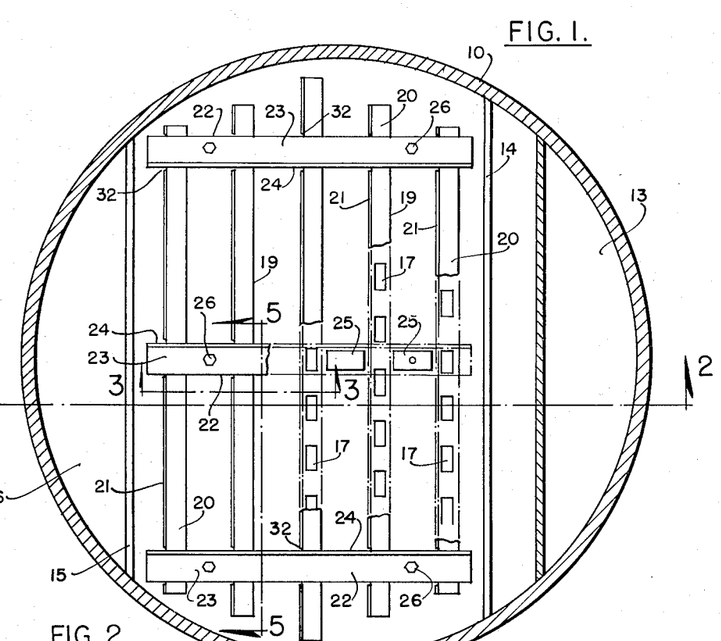
Figure 1 is a sectional plan view of a bubble tower or the like provided with a gas and liquid contact apparatus constructed in accordance with the present invention.
Figure 2:
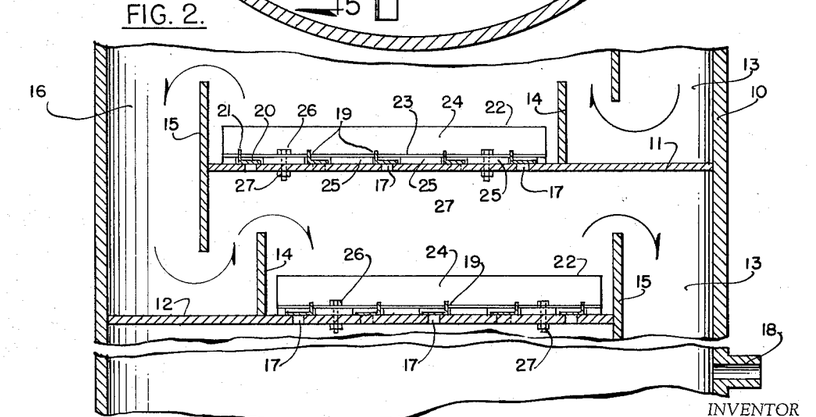
Figure 2 is a vertical sectional view taken substantially along line 2—2 of Figure 1 showing the next tray beneath the tray of Figure 1.

Referring to the drawings, the gaseous and liquid contact apparatus is shown in the form of a bubble tower 10 which may be provided with any suitable number of vertically spaced trays alternately arranged laterally such as tray 11 in respect to tray 12 (Fig. 2) so as to provide a crosswise passage for liquid from one side of tower 10 to the other side upon traversing each tray in its travel from its entrance to the uppermost tray to its exit from the bottom tray of tower 10. Each tray of the bubble tower is provided with a down spout 13 positioned on one side of the bubble tower for receiving the descending liquid and directing the same over a seal-weir 14 (Fig. 2) onto and across the tray 11 and over an over-flow weir 15 into a spout 16 identical to down spout 13 but on opposite sides of the tower 10. The spout 16 is positioned above the tray 12 and diametrically opposite the spout 13. Each tray between the seal-weir 14 and the over-flow weir 15 is provided with one or more flow openings or passages 17 preferably arranged in spaced transverse rows that allows the gas or vapor to flow from below each of the trays to points above the same during the operation so as to provide intimate contact and mixing of the upwardly flowing gas or vapor with the descending liquid as it laterally traverses the tray. Gas or vapor under pressure may be introduced into the gaseous and liquid contact tower 10 through an inlet 18 (Fig. 2) positioned in one side thereof and below the bottom tray of tower 10, thence from tower 10 through a similar exit opening, not shown, positioned above the uppermost tray of tower 10 after vertically traversing upward through each tray successively in its passage.

Figure 3:
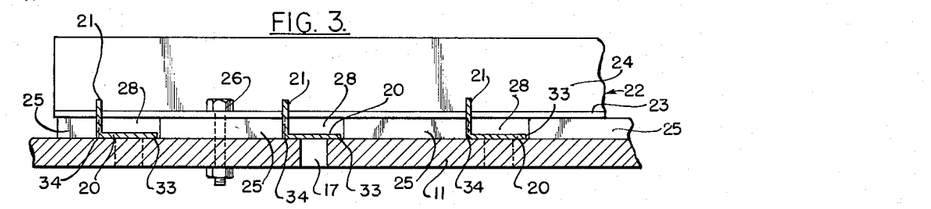
Figure 3 is an enlarged vertical sectional view taken substantially along the line 3—3 of Figure 1.
Figures 4, 8:
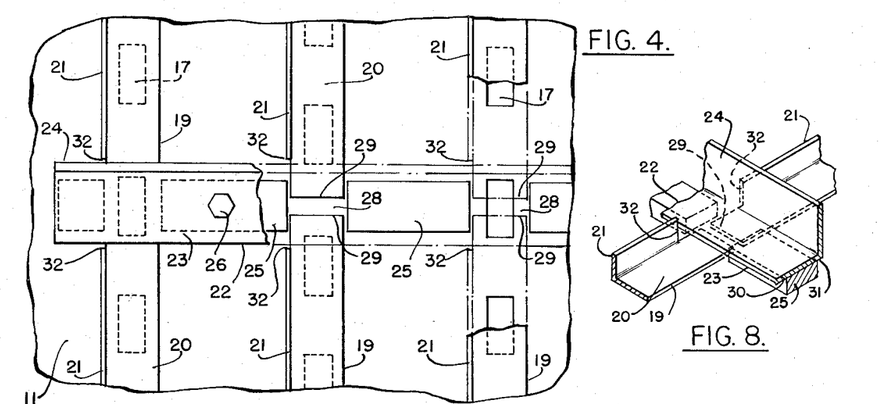
Figure 4 is a detailed plan view of Figure 3 with parts in section for clearness of illustration.
Figure 8 is a detailed perspective view showing the floating pivoted valve and associated retaining plate.
Figure 5:
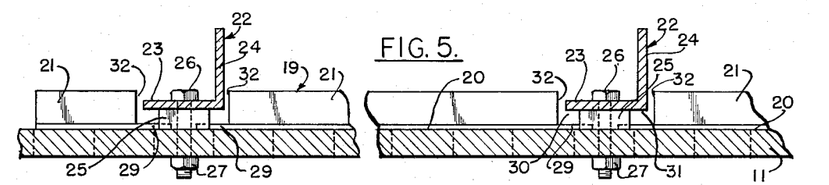
Figure 5 is an enlarged vertical sectional view taken substantially along lines 5—5 of Figure 1.

The rows of flow openings 17 formed in these trays are covered or closed by flow-regulating means preferably in the form of angularly or L-shaped valve members 19. Each of the valve members 19 has a horizontal leg or portion 20 and a vertical leg 21 and may vary in length and size to meet the particular layout requirements of the tray to which they are applied. Each of the flow controlling members 19 constitutes a floating or movable pivoted valve and is of such a length that its horizontal leg overlaps a row of slotted openings 17 and normally engages by gravity the top of the tray to close the flow passages. Each of the spaced floating pivoted angulated valves 19 is held within desirable limits of both lateral and longitudinal position on its associated tray by transversely disposed retaining members or brackets 22 which may vary in number in accordance with the number of rows of flow openings and floating pivoted angulated valves that are associated with the trays. Each retaining member or stop means 22 may be of angular shape so as to have a horizontal or flat portion 23 and a vertical upwardly extending portion or arm 24. Additionally, depending spaced plates or portions 25 are permanently connected to the underside of the flat portions 23 of the retaining members 22 in any suitable manner such as by spot welding. As shown, the plates 25 and retaining members 22 are detachably retained in a fixed position in the bubble tower by the threaded bolts 26 which extend through the tray and are maintained in a fixed position by the nuts 27 (Fig. 5). Each of the plates 25 is of such a length as to terminate short of the openings 17 and co-act with the top of the tray and the horizontal portion 23 of each of the retaining members 22 (Fig. 3) to provide spaced chambers 28 adjacent and above the openings 17. These chambers receive the opposed inner ends and outer extremities of the horizontal flat portion 20 of the floating pivoted angulated valve members 19 which normally rests on the top of the tray so as to close the openings 17 (Fig. 3). The outer ends of the valve members 19 extend under the end retaining members 22 (Fig. 1) and are spaced from the adjacent inner wall of the tower 10. The number of transverse spaced rows of openings 17 may vary in accordance with the application and use to be made of the gaseous and liquid contact apparatus. Assuming that five rows of such openings are provided such as shown in Fig. 1, there will be a corresponding number of rows of floating pivoted angulated valve members 19 and any suitable number of spaced members 22, three being shown for purposes of illustration. Each of the plates 25 is of less width than the horizontal portion 23 of the retaining member 22 (Fig. 8) so as to provide shoulder portions, the function of which will later be described. The floating pivoted angulated valve members 19 intermediate the length of the transverse rows of openings 17 are separated so as to have opposed spaced inner ends 29 (Fig. 4) positioned on each side of a retaining plate 22 and which loosely extends into a chamber 28 between the spaced flanges 30 and 31 (Fig. 8) on opposite sides of the leg 23 of the retaining member 22. At the points where the retaining members 22 intersect or cross the floating pivoted angulated valves 19, the vertical flanges or legs 21 are cut out or removed to form opposed stop shoulders 32. The length of the cut out portion of the vertical flange 21 is slightly shorter than the end portions 29 that extend under the retaining members 22 so that each horizontal leg 20 of the floating pivoted angulated valve 19 adjacent its ends is displaceably mounted in the chambers 28 (Fig. 3). The shoulders 32 on the cut out portions of the vertical flanges or legs 21 provide stops for limiting the longitudinal movement of the valve relative to the retaining member 22. The plates 25 constitute depending portions of the retaining members 22 and are longitudinally spaced to co-act with the edges of end portions 29 of the valve members 19 to provide a floating pivotal movement of the valve members in the chambers 28 and also restrict the lateral movement of each of the valve members 19 to a minimum as well as providing means for properly centering the valve members over the flow openings 17 of the trays. It will be seen that floating pivoted angulated valve 19 is narrower by the thickness of vertical flange 21 at the end sections 29 extending into chamber 28 under retaining member 22 (Fig. 4). Thus, the overhang or extra width of element 19 at the ends of vertical flange 21 constitute the shoulder portions 32. Because of shop assembly imperfections and variations in tolerances of dimensions of stocks from which parts are made the plate 25 will, in a number of instances, project from underneath leg 23 of retaining member 22 (Fig. 4), when made of the same width stock as leg 23, thus forming a shoulder along one edge or the other of leg 23 against which shoulder portions 32 of legs 21 engage and stick. Thus, by making plate 25 narrower than leg 23 of retaining member 22, plate 25 cannot project from underneath leg 23.

Figure 6:
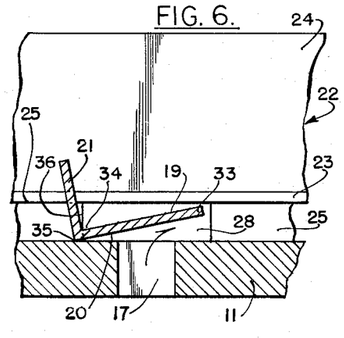
Figure 6 is a detailed vertical sectional view showing one of the floating pivoted valves moved or rocked on one edge or side so as to raise the opposite side thereof.
Figure 7:
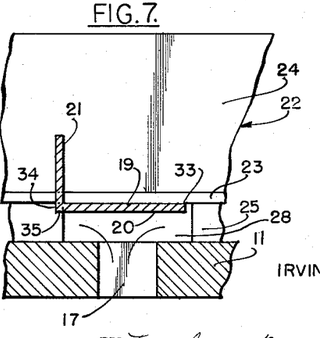
Figure 7 is a detailed vertical sectional view showing the floating pivoted valve moved to its completely opened or raised position.

By reason of the angular configuration of each of the floating angle pivoted angulated members 19 and the fact that the horizontal leg 20 is of longer length than the vertical leg 21, each of the vertically displaceable valve members 19 is formed with what may be referred to as a light side or edge 33 and a heavy side 34 positioned at the juncture of the horizontal leg 20 with the vertical leg 21 (Fig. 3). Moreover, when each of the floating pivoted angulated valves is in its closed position it rests on the top of its associated tray such as 11 (Fig. 3) so that upon the gas or vapor being introduced into the contact apparatus through the inlet 18 and passing upwardly through the flow openings 17, the pressure of the gas will initially cause each of the valve members 19 to swing or rock about a fulcrum point or edge 35 (Fig. 6) to raise the light end 33 upwardly to an inclined position in engagement with leg 23 of retaining member 22 to allow a limited amount of the gas or vapor to escape through the openings 17. Further, upon increase of the differential pressure of the gas or vapor passing through the openings 17, the valve 19 will be raised in the chamber 28 to a position of engagement with and immediately below the horizontal leg 23 of the retaining member 22 (Fig. 7) so as to allow a complete and full discharge of the gas or vapor upwardly through the openings 17. Thus it will be seen that each of the valve members 19 is so mounted on the top of a tray that the flow of gas or vapor through openings 17 is normally opposed by the head of the liquid over each of the trays resulting from the empoundment of the liquid of each of the over-flow weirs, weight of valve members 19 and the restriction of further opening of the valve member beyond the limits defined by the top wall 23 of the chamber 28 (Fig. 7).

In operation, as sufficient gas or vapor pressure differential accumulates across each of the trays to overcome the liquid head above the tray and the weight of edge 33 and starts lifting or rocking the edge 33 around its fulcrum 35 (Fig. 6) it will allow a limited amount of the gas or vapor below the tray to pass upwardly through the flow openings 17 to above the tray. The light edges 33 of the floating pivoted angulated valve 19 open in the order of the magnitude of submergence in the liquid on the tray 11 with same opening at increasing low capacity load consecutively by rows from the liquid exit towards the liquid entrance side of tray 11. All light edges 33 throughout tray 11 become open as shown in Fig. 6 at approximately 20% of the maximum capacity, in terms of capacity at the maximum allowable pressure differential across the tray 11. This pressure differential across each tray is relatively small yet of sufficient magnitude to accomplish complete distribution of the gas or vapor throughout all of the valve members 19 associated with each tray. Thus, when the rate of gas or vapor flow reaches this point, the liquid surrounding the flow passages 17 loses its density, as a result of gas or vapor impingement into the liquid producing numerous small bubbles, and the effect of differences of liquid head at each flow passage 17, by reason of initial differences in submergence in liquid above and surrounding the different flow passages 17 is almost entirely eliminated. For this reason, no perceptible unevenness in distribution of gas or vapor exists at this pressure differential or rate of flow, or develops as pressure differentials at corresponding rates of flow progress to the maximum capacity of the liquid contact apparatus or bubble tower 10. It will be seen that as pressure differential increases when the valves 19 are in the position as shown in Fig. 6, the rates of gas or vapor flow correspondingly increase. At approximately twice the pressure differential to which light edge 33 of leg 20 of the valve members 19 started opening and became wide open, edge of fulcrum point 35 on the heavy side of the valves 19 start to open or be raised. The edge 35 of all valves 19, due to the uniformity of surrounding liquid head established between all the valve members 19 on each of the trays, will throttle open in unison to the degree required to pass the rate of gas or vapor flow admitted to the tray. As the rates of gas or vapor flow progress, edges 35, finally reach the position shown in Fig. 7, where the light outer edges 33 will remain in the position shown in Fig. 6 while the edges 35 will move from their closed position to their wide open position (Fig. 7) without any appreciable increase in pressure differential across the tray 11. With the floating pivoted angulated valves 19 in the position shown in Fig. 7, additional rates of flow of gas or vapor are passed with corresponding increases in pressure differential across tray 11 until the maximum allowable pressure drop is reached at which point the maximum capacity of gas or vapor flow is established. In this connection it may be mentioned that as the legs 20 start to move or open from the position shown in Fig. 3 to that shown in Fig. 6 there is a period of instability during which time the legs 20 may flutter from open to partially closed position at a moderate frequency, until the position shown in Fig. 6 is attained. During this action or movement, each of the floating pivoted angulated valves 19 is shifted to a point where edges 35 engage the adjacent vertical sides 36 (Fig. 6) of the depending plates 25. As edges 35 rise, their contact with the sides 36, serve as a dampening action so that the edges 35 throttle opening movement without any unstability or fluttering as do the lighter edges 33 when initially displaced upwardly away from the flow opening 17. The valve members 19 remain stationary or fixed at increased rates of gas or vapor flow after reaching the full position as shown in Fig. 7. Conversely with decreasing rates of flow through the openings 17 the action of the valves 19 are exactly the same as during the process of opening with edges 35 throttling to a closed position and then the edges 33 fluttering moderately through approximately the lower 20% of the capacity range of the tower 10.

When the pressure differential across the lowermost tray of tower 10 exceeds the weight of floating pivoted angulated valves 19 and the head of liquid over same, due to the empoundment of liquid by the overflow weir 15, gas or vapor will flow from below the tray through the rows of openings 17 under the control of the primary movement of the flow regulators or floating pivoted angulated valve members 19 by the engagement of light edges 33 with leg 23 of retaining members 22. As the rates of gas or vapor flow increase, a secondary movement of floating pivoted angulated valve members 19 occurs in a throttling manner until finally they are restricted by the upper limit of their travel by leg 23 of retaining members 22 in the spaced chambers 28. Similarly and simultaneously, the differential pressure of the gas or vapor across the uppermost tray and each of the intermediate trays will bring them into this same operation.

By reason of the uniformity in division of flow through the multiplicity of openings 17, the velocity of the gas or vapor between the trays is uniform throughout the entire cross-sectional area of the tower and not excessive in some areas. It will, therefore, be seen that there is minimized entrainment and the upward carrying of drops of liquid from one tray to the next by excessive velocity in some areas of rising vapors. Consequently, there is an abundant formation of foam through the entire area of the tray indicative by the intimacy and effectiveness of contact between the gas or vapor with the descending liquid.

The operation of this contact apparatus is in marked contrast with conventional bubble trays including the bubble cap and chimney arrangement of the prior art where the resistance to flow through each opening is insufficient upon initiation of gas flow therethrough, thus not providing uniform subdivision of the flow of the rising gas or vapor amongst the bubble caps or the like distributed throughout the surface of each tray, whenever flow rates below the designed capacity of the tower is encountered. Thus, with this contact apparatus operating at any rate in excess of approximately twenty percent (20%) of its designed capacity, each of the flow regulating members 19 will pass additional volumes of gas or vapor as the pressure differential increases to the point where heavy edges 35 of floating pivoted angulated valves 19 start rising in unison to allow a portion of the gas to pass through openings provided by a partially raised position of heavy edges 35 (Fig. 6), and in a throttling fashion to further increase the flow passage areas, and finally with both sides of the valves 19 completely opened so that additional volumes of gas or vapor are passed as the pressure differential increases, with the volume of gas or vapor at all times subdivided equally amongst all the flow passages 17. Accordingly, there will not only be uniformity of flow of gas or vapors through the many openings 17 of each of the trays, but there will be simultaneous flow through the multiplicity of openings 17 in the remaining trays of the bubble tower 10. The bubble tower or liquid contact apparatus as a whole is maintained in highly efficient operation for a wide range of loads or capacities under which it may from time to time operate.

The foregoing operation of the invention is based upon comparative operation of a bubble tower five feet in diameter and generally used as an absorber in petroleum refining operations. With standard bubble caps and chimneys, it was observed that with a liquid flow rate varying from about 67 gallons per minute to around 313 gallons per minute with the gas flow varying from around 300 standard cubic feet per minute to around 729 standard cubic feet per minute there was not uniform bubbling through the 49 bubble caps arranged in six rows of 7 to 9 caps per row. In no case could any more than about three-quarters of the bubble caps be made to take gas by adjustment of both the liquid and gas throughout the full range of volumes. On the average, and even perhaps for the greater part of the tests made, only two rows were in effective operation, or the gas was flowing through only approximately one-third of a total number of bubble caps.

Thus, simple, efficient and economical means are provided for insuring uniformity in subdividing the flow of the upwardly flowing gases through a liquid contact apparatus such as the bubble tower 10, and which readily adapts itself to any desired capacity or load. Each of the floating pivoted angulated valves 19 is urged by gravity against the upper surface of the tray to close the flow passages 17, and is automatically operable against gravity to effect a throttling action on the gas with variations in the differential gas pressure from below the tray to above the same. It will be manifest that the displaceable floating pivoted angulated valves 19 and the retaining members 22 may be of various weights, sizes and shapes, depending upon the particular type of contact apparatus with which they are to be used.

Figure 9:
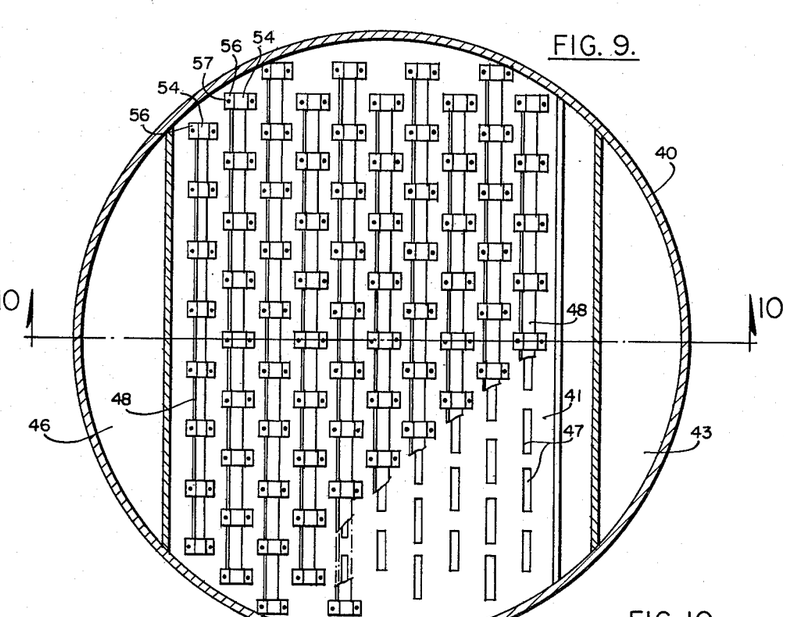
Figure 9 is a sectional plan view of a bubble tower or the like provided with a modified form of gas and liquid contact apparatus constructed in accordance with the present invention.
Figure 10:
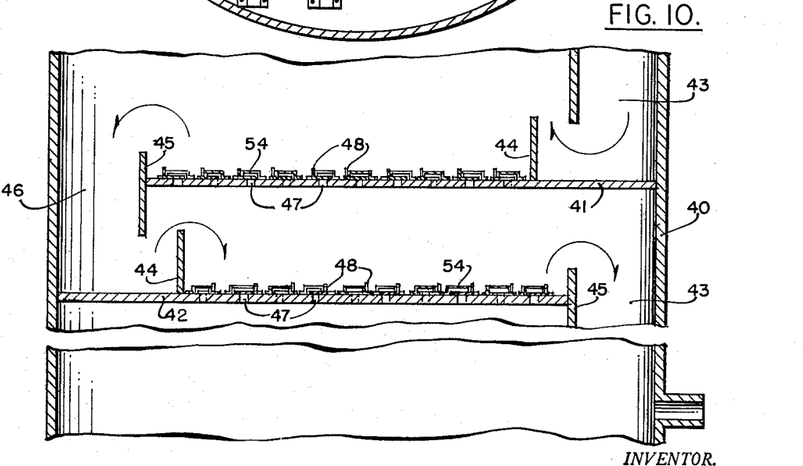
Figure 10 is a vertical sectional view taken substantially along line 10—10 of Figure 9 showing the next tray beneath the tray of Figure 9.
Figure 11:
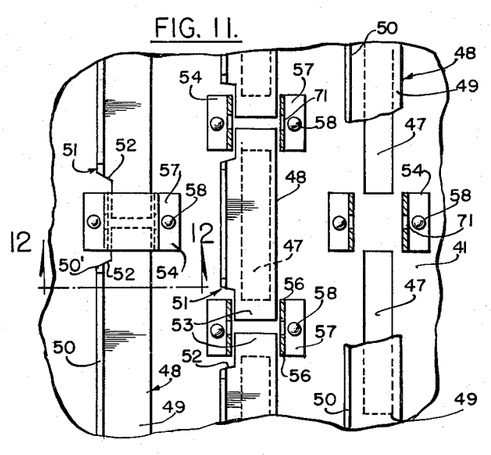
Figure 11 is an enlarged detailed plan view of Figure 9 with parts removed for clearness of illustration.
Figure 12:
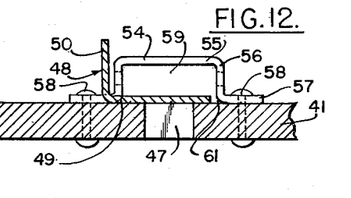
Figure 12 is a vertical sectional view taken substantially along the line 12—12 of Figure 11 showing a flow regulating element or valve in its normally closed position.
Figure 17:
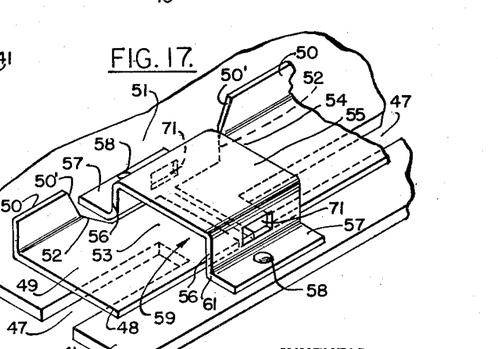
Figure 17 is a detailed perspective view with parts in section showing the means for movably connecting adjacent ends of the valves shown in Figure 9 to a bubble tray.

In the modified form of the invention shown in Figs. 9–17, inclusive, 40 indicates a bubble tower which may be provided with any number of vertically spaced trays such as 41 and 42 (Fig. 10). Each tray includes a downspout 43 for descending liquid. The liquid as it issues through the downspout 43 flows over a seal-weir 44 on to and across the tray and over an overflow-weir 45 and then into a downspout 46 to the next tray such as the tray 42 (Fig. 10) which is of identical construction to the tray 41 and has its overflow-weir 45 disposed diametrically opposite to the weir on the tray 41. Each tray is provided with a plurality of flow openings 47, each of which is normally closed by a flow regulating means 48 each preferably in the form of a floating pivoted angulated valve similar in construction and operation to the valve 19 previously described. Each tray may be provided with one or more transverse rows of spaced openings or slots 47 (Fig. 9) dependent on the size or area of the tray floor to which the invention is to be applied with ten rows being shown on tray floors 41 (Fig. 9). Each of the floating pivoted angulated valves 48 is formed with a horizontal leg 49 and a vertical leg 50 (Fig. 12) and is normally arranged to rest on the top of a tray so that the horizontal leg or portion 49 overlaps and closes an adjacent opening 47. The horizontal leg 49 is preferably longer than the vertical leg 50 and the valve 48 may be of any suitable selected length to best satisfy the layout requirements to which it is applied. The ends of each of the floating pivoted angulated valve members 48 has the vertical leg 50 thereof cut out or removed as at 51 (Fig. 11) to form the opposed inclined sides 50' (Fig. 17). The ends of the horizontal leg 49 adjacent the cut-out portion 51 is similarly cut away as at 52 so as to provide a reduced shoulder end portion 53. Each of the valve members 48 is held within desired limits of both lateral and longitudinal positions on the tray by longitudinally spaced retaining members or brackets 54. Each of these retaining members 54 is preferably formed with an intermediate substantially U-shaped transverse portion 55 having parallel depending arms 56 that terminate in horizontally disposed flanges 57 extending outwardly from opposite sides of the retaining member. The flanges 57 rest on a tray and are secured thereto in any suitable manner such as the rivets or bolts 58. The angulated pivoted valve members 48 are separately mounted and independent of each other and are arranged to be movably maintained on each of the trays by the retaining members 54. The horizontal portion 55 of each of the U-shaped members 54 is spaced centrally over the center-line of transverse rows of slots and between slots or groups of slots 47 (Fig. 9) of a tray, such as 41. The members 54 are transversely disposed relative to the reduced ends 53 of adjacent valve members 48 (Fig. 17) so that the ends 53 loosely extend from opposite sides of the retaining member 54, into an opening or space 59 formed between the top of a tray and the transverse portion 55 of each retaining member to limit vertical movement thereof. At the same time one end of the retaining member 54 extends into the space 51 formed by the removal of the vertical legs 50 so as to coact with the sides 50' and 52 for limiting axial or longitudinal movement of the valve members when the parts are assembled.

Thus, each of the angulated floating pivoted valves 48 is operable to be raised or moved away from its adjacent flow opening 47 upon differential fluid pressure from below the tray 41 to above the same, and upon increase of the differential fluid pressure to permit increase flow of fluid through the openings 47. The slots or groups of slots 47 may each preferably terminate substantially at the edges of space 59 formed by U-shaped transverse portion 55 so that the slots or groups of slots are fully covered by horizontal leg 49 of angulated floating pivoted valve 48 while in the closed position. Extra strength to tray 41 is also afforded by the termination of slots at substantially the edges of space 59 thus leaving original material of tray 41 in the areas under space 59 covered by retaining members 54.

Figure 13:
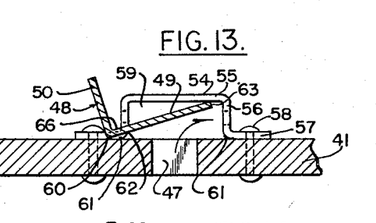
Figure 13 is a view similar to Figure 12 showing the valve moved or rocked on one edge so as to raise the opposite side away from the bubble tray.
Figure 14:
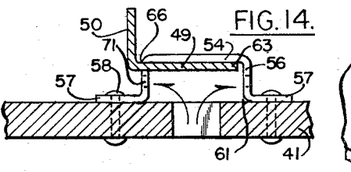
Figure 14 is a view similar to Figure 12 showing the floating pivoted valve in its completely raised position.

Each floating pivoted angulated valve 48 is so constructed that the pivot point 60 (Fig. 13) is spaced or offset from its adjacent flow opening 47 and is positioned outside of the retaining members 54. As these retaining members or brackets 54 are preferably formed by stamping they become rounded at points 61 (Fig. 13) even with a most precise stamping operation, and when the valves 48 and retaining members 54 are made of approximately the same thickness, the magnitude of the rounded portion or ledge within space 59 at points 61 are sufficient to partially engage one or the other of the adjacent edges of the reduced end 53 of the valve 48 at one or the other of these points 61 so as to prevent the edge of the valve, in engagement with retaining member, from moving vertically upward until it shifts towards the other side of opening 59. As gas or vapor passage starts through slot 47, whenever the light side 63 of valve 48 (Fig. 13) may be in contact with its adjacent point 61, the entire valve starts to drift and upon so doing shifts towards the heavy side 66 of valve 48 so as to bring the edge of reduced end 53 of the heavy side 66 of the valve in contact with retaining member 54 at its adjacent point 61. By the arrangement of the pivot point 60 being offset relative to the retaining members 54, the reduced end 53 of the leg 49 of the valve that extends into the opening 59 adjacent the pivot 60, is raised above the tangent point 62 (Fig. 13) of the round point 61 of the retaining member whenever the light side 63 of the valve is raised to the position as shown in Fig. 13. When the valve is moved to this position the opposite or heavy side of the leg 49 may then subsequently freely throttle open and close as volumes of gas pass upwardly through the openings 47 and the pressure differential varied beyond the range at which the valve 48 is moved to allow the gas or vapor to pass to the top or above each of the trays. The operation of the valves 48 are substantially similar to the valves 19 previously described and the upward movement of each valve relative to its tray is limited by engagement of the reduced ends 53 of each horizontal leg 49 with the underside of the horizontal portion 55 of the retaining member or brackets 54 (Fig. 14). Each depending arm 56 of retaining member 54 is preferably arranged with an intermediate slot or rectangular window 71 (Fig. 17), to insure free circulation of gas or vapor and the venting of same from within space 59 into the adjacent liquid above tray 41, thus means are provided to prevent the accumulation of impurities or foreign matter carried by either the gas or vapor and liquid, such as solids or other fouling material, within space 59 and which would eventually interfere with the normal and efficient operation of angulated valve 48.

Figure 15:
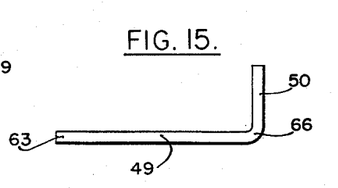
Figure 15 is a detailed side view of a floating pivoted valve showing in dotted lines the vertical leg thereof being of variable length so as to change tthe float characteristics of the apparatus.
Figure 16:
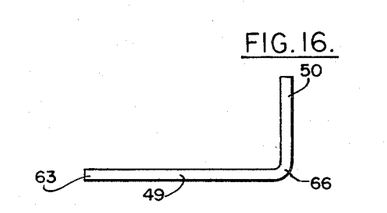
Figure 16 is a view similar to Figure 15 showing in dotted lines the angle of the vertical leg being varied in respect to the longer horizontal leg.

Figures 15 and 16 show modifications of the formation of each of the floating pivoted angulated valves 48 so as to provide means for constructing various performance characteristics into the gas or vapor and liquid contact apparatus. As shown in Fig. 15, the vertical leg 50 may be lengthened so as to cause the light side 63 of the angulated floating pivoted valve 48 to raise through a range of low value pressure drop and subsequently the opposite or heavy side 66 to raise through an increased range of low value pressure drop. The horizontal leg 49 normally lies flat on the tray so as to close the adjacent openings 47. As operation starts, the light edge 63 starts rising, when the gas pressure differential upwardly through the device equals the weight of the light edge 63, and the head of liquid on top of tray 41, with no perceptible change in differential pressure resulting as increased volumes of gas are passed, until light edge 63 engages the underside of transverse portion 55 of retaining member 54 (Fig. 13). In this position further increased volumes of gas or vapor are passed as the pressure differential across tray 41, or the net pressure on the underside of the floating valves 48 increases. Finally, when the pressure differential across tray 41 becomes equal to the weight of the heavy side 66 (Fig. 15) of the floating pivoted angulated valves 48 and the head of liquid on top of tray 41, the heavy side 66 starts to rise. As increased volumes of gas are passed through the openings 47, the heavy side continues to rise at very slight increases of differential pressure until finally the heavy side 66 is in the uppermost position as shown in Fig. 14. With the floating pivoted valve 48 in this wide open position, increased volumes of gas are passed upwardly through the openings 47 as the differential pressure increases across each of the trays. The difference in differential pressure at which the light edge 63 (Fig. 15) initially rises and the differential pressure at which the heavy side 66, to which vertical leg 50 is attached, subsequently rises may be increasingly varied by the length of the short vertical leg 50 as indicated by the dotted sections 64 and 65 respectively. This increased length of leg 50 will result in a higher differential pressure for raising the heavy edge 66.

Referring to Fig. 16, the degree of differential pressure at which the light edge 63 opens for any given total weight of the floating pivoted angulated valve 48, and also the differential pressure at which the heavy edge 66 opens, may be varied by shifting the center of gravity of the angulated valve 48 by varying the angle of junction of the long leg 49 with the short leg 50. At a smaller angle, the pressure differential to raise the light edge 63 is greater, while at a larger angle, the pressure differential to raise light edge 63 is lesser than in the vertical position of short leg 50.

It will thus be seen that by varying the length of the short leg 50 (Fig. 15) and varying the angle of junction of the short leg 50 with the long leg 49 (Fig. 16), that a wide range of performance characteristics relative to the pressure differential at which the light edge 63 and heavy edge 66 of the valve 54 will open, is accomplished. Moreover, it is obvious that the spread or difference in the pressure differential at which the light edge 63 and heavy edge 66 will open may be varied as the particular operation conditions may require. These observations have been made as a result of tests in which the differential pressure at which light side 63 was raised from .3 to 1.0 inch of water pressure, and the differential at which the heavy side 66 of valve 48 started to rise was from .8 to 2.2 inches of water pressure. In all cases, the full opening of heavy side 66 was at .2 to .3 inch greater differential pressure than the differential where it started to open. These ranges of pressure differential are all within range of good operational requirements for all varieties of products to be treated with some products requiring lower differentials and others higher differentials.

Figure 18:
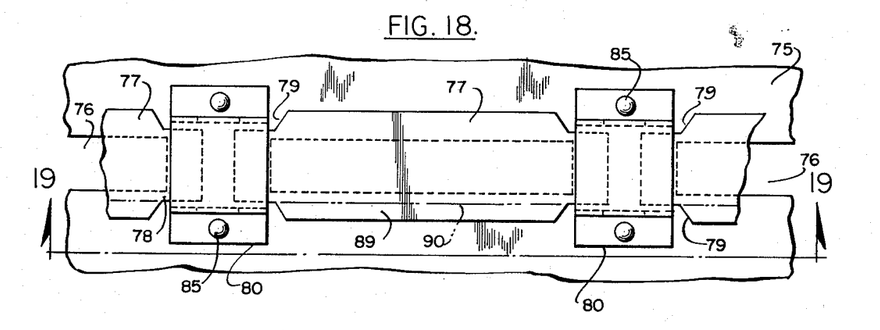
Figure 18 is a detailed sectional plan view of a modified form of the invention.
Figure 19:
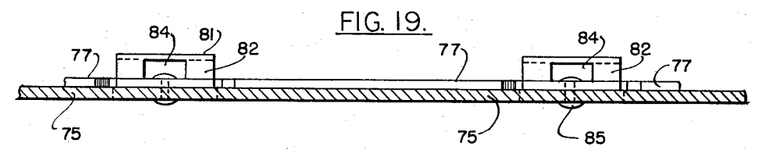
Figure 19 is a sectional view taken substantially along the line 19—19 of Figure 18.
Figure 20:
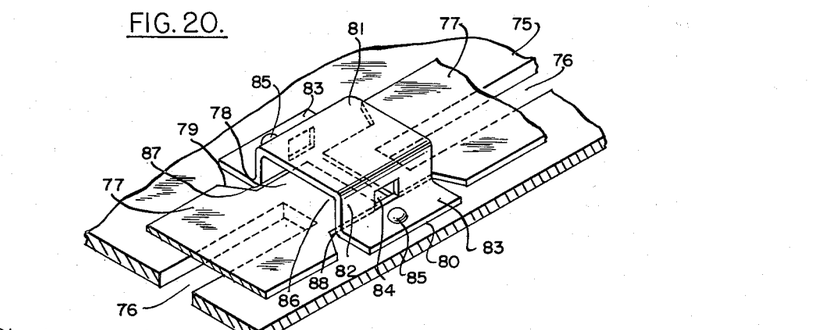
Figure 20 is a perspective view of the valve assembly shown in Figure 18.

In the modified form of the invention shown in Figures 18, 19 and 20, there is shown a tray 75 of a liquid contact apparatus such as a bubble tower or the like. Any number of these trays may be positioned within the contact apparatus and each tray is provided with one or more spaced flow openings or slots 76 which may be closed by one or more floating pivoted valves 77, preferably of flat elongated shape and arranged normally to rest on the top of the tray 75 so as to overlap and close an adjacent opening 76. The openings 76 may be arranged transversely in parallel spaced rows and disposed at any desired horizontal angle relative to the tray 75, depending upon the size and particular purpose to which the contact apparatus is to be used. The ends of each of the floating pivoted valves 77 is cut away or reduced as at 78 so as to form the inclined shoulder portion 79. Each of the valves is movably mounted relative to its associated opening or slot 76 by the spaced retaining members 80 which preferably are of substantially U-shape. Each retaining member 80 is thus formed with a horizontal transverse portion 81 having parallel depending sides 82 which terminate in outwardly and horizontally disposed flanges 83 (Fig. 20). The sides 82 may be provided with aligned slots or openings 84. Each of the retaining members 80 is connected to the tray in any suitable manner such as by bolts or rivets 85. It will be seen that the retaining members 80 are so positioned as to overlap the reduced end portions 78 of the valves 77 and provide means for separately and independently mounting the floating pivoted valves in position relative to their associated flow openings 76. The reduced end portion 78 of each valve 77 extends loosely into a space or chamber 86 between the horizontal portion 81 of the retaining member and the tray, so as to position the valves substantially centrally of the openings 76. Additionally, the horizontal portion 81 constitutes a stop to limit the upward vertical movement of the valves 77. The inclined shoulders 79 coact with the adjacent sides of the retaining member 80 to limit the axial or longitudinal movement of each floating pivoted valve 77 when the parts are assembled.

It will be noted that each of the flat floating pivoted valves 77 differ from the angulated floating pivoted valves previously described, in that the valve 77 normally floats bodily upward and does not pivot on either edge unless one edge or the other is initially in engagement with its adjacent rounded portion 87 of the retaining member 80 (Fig. 20). If one side of valve is in such initial engagement with the rounded portion 87, said side of valve then becomes a pivotal side with its opposite side initially rising in a manner similar to the rising of an angulated valve 48 previously referred to. Either side of the valve 77 is so arranged that the pivot is outside or offset relative to the retaining member 80, and as the opposite side rises, the edge of each reduced end 78 of the floating pivoted valve, which is now in engagement with the rounded portion 87, is raised to the tangent point 88 (Fig. 20) of the rounded portion 87.

Figure 21:
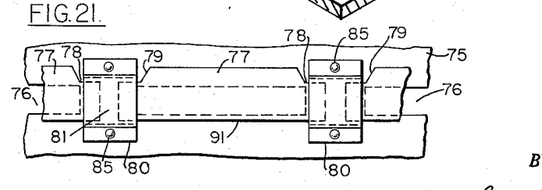
Figure 21 is a plan view similar to Figure 18 but showing the floating pivoted valve provided with a heavy side and a light side.

While each of the floating pivoted valves 77 is shown of substantially the same width on opposite sides of the openings 76, each valve may be of less width on one side of the opening 76 than on the opposite side thereof, such as by removing the side area 89 (Fig. 18) along the dotted line 90, to form the light side 91 as shown in Figure 21, so that one edge of the valve 77 is in longitudinal alignment with or an extension of the reduced end portions 78 and with the inclined shoulders 79 removed. When the side 89 of the valve is removed then the opposite side only is provided with the inclined shoulders 79, so that this side constitutes the heavy side and the fulcrum about which the valve pivots when initially raised.

The floating pivoted valve 77 is normally maintained in the closed position by gravity. It will be seen that as gas or vapor starts to pass upwardly through the slots 76 from below the tray 75, that the row of valves 77 submerged in the least head of liquid, nearest the liquid exit side of the tray 76, will start to open. As gas or vapor flow increases, with corresponding increase of gas or vapor pressure differential across the tray 75, successive rows of valves 77, from the liquid exit toward the liquid entrance side of the tray 75, will rise and finally, upon reaching a gas or vapor passage of approximately 50% of the maximum capacity the system is capable of handling, all of the valves 77 will become wide open. With each of the floating pivoted valves 77 in this wide open position, increased volumes of gas or vapor are passed upwardly through the openings 76 as the differential pressure increases across each of the trays 75. The performance characteristics of floating pivoted valves 77 may be varied by the weight through varying the thickness and the material from which they are constructed. By floating pivoted valve and floating pivoted angulated valve as referred to in the specification and claims is meant a valve which is displaceable on a moving pivot or axis as contrasted to a fixed pivot.

For the purpose of illustration in all forms of the invention shown the fluid openings or slots in the trays have been shown arranged in transverse rows across the trays and positioned at right angles to the direction of flow of the liquid as it moves from the seal weir to the overflow weir. It will be manifest that this arrangement may be varied and the rows of flow openings and their associated valves be positioned so that the flow of liquid across each tray is parallel to the rows of flow openings and their associated floating pivoted valves. Moreover, the rows of flow openings and their associated valves may be arranged in diagonal rows transversely across the tray at any desired angle relative to the direction of flow of the liquid as it traverses the tray from the inlet seal weir to the overflow weir. It will be noted that in all forms of the invention the stop means is spaced from the tray a distance less than the width between the side edges of the floating valve.

The position of the angulated valves as shown in Figures 1–17, inclusive, is such that the liquid flows toward the light edges and away from the heavy edges of each of these valves, so that in the initial opening of the valves the gas or vapor impinges into or opposes the flow of liquid as it traverses the tray. The position of these angulated floating pivoted valves may desirably be reversed in respect to the flow of liquid across the tray for special applications of service or use such as where the flow or liquid from its entrance in the seal weir 14 to its exit at overflow weir 15 (Fig. 1), is towards the heavy edges and away from the light edges. Similarly, in certain applications of the invention the position of the valves in respect to the heavy edges and the light edges may desirably be arranged alternately or otherwise in relation to the flow of liquid across the tray whether the transverse rows of flow openings be at right angles, parallel or at an inclined angle with respect to the flow of liquid across the tray.

It will be understood that the several forms of the invention shown and described are merely illustrative of preferred embodiments and that such changes may be made without departing from the spirit of the invention, as called for in the following claims.

I claim:

1. In a gas and liquid contact apparatus of the class described, a tray having a flow opening, a floating pivoted valve mounted above the tray for rocking movement at one side edge thereof on the tray adjacent the flow opening and arranged to cover said opening, said floating valve having one side edge heavier than the opposite side edge thereof, stop means above the floating valve for limiting the upward movements thereof relative to the tray, the stop means being spaced from the tray a distance less than the width between the side edges of the floating valve, said side edges being free to move upwardly or downwardly independently of each other, and said floating valve being operable upon variation in the differential gas pressure from below the tray to above the same to cause the floating valve initially to be rocked upon its heavier side edge so as to tilt the light side edge away from said opening to engagement with said stop means with the floating valve in an intermediate open position, and upon increase in the upward differential gas pressure to cause the floating valve to pivot about its light side edge at the point of contact with the stop means so as to raise the heavy side edge away from the flow opening and in engagement with said stop means with the floating valve in full opened position being in full contact with the stop means.

2. In a gas and liquid contact apparatus as called for in claim 1 in which said floating valve is of angulated shape in cross section so as to have one side thereof heavier than its opposite side.

3. In a gas and liquid contact apparatus of the class described, a tray having a row of spaced flow openings, an angularly shaped floating pivot valve having a horizontal leg and a vertical leg extending upwardly from one side of the horizontal leg so that the horizontal leg has one side heavier than the opposite side thereof, retaining means above the valve for limiting the upward movement thereof relative to the tray, said retaining means being spaced from the tray a distance less than the width between the side edges of the floating valve so that the horizontal leg normally closes said flow opening, said floating valve being operable upon variation in the differential gas pressure from below the tray to above the same, to cause the horizontal leg initially to be rocked on its heavy side to raise the opposite side away from said openings and upon increase of the upward differential gas pressure to raise the heavy side also away from the flow openings.

4. In a gas and liquid contact apparatus of the class described, a tray having spaced transverse rows of flow openings, angularly shaped floating pivoted valves for closing said openings, each of said floating valves having a horizontal leg and a vertical leg extending upwardly from one side of the horizontal leg so that one side of the horizontal leg is heavier than the opposite side thereof, spaced retaining members above the floating valves and extending transversely thereof, each of said retaining members having depending spaced portions extending longitudinally thereof between the rows of floating valves, means for securing the retaining members to the tray, said retaining members coacting with the top of the tray to provide spaced chambers in the areas of intersection of the retaining members with the floating valves, the horizontal legs of the floating valves having spaced portions vertically movable in said chambers, said floating pivoted valves operable upon variation in the differential gas pressure from below the tray to above the same to cause the light sides of the horizontal legs of the floating pivoted valves initially to be raised relative to said flow openings and upon increase of the upward differential pressure to move the heavy sides of the floating pivoted valves away from said openings.

5. In a gas and liquid contact apparatus of the class described, a tray having a row of spaced flow openings and spaced angulated floating pivoted valves for closing said openings, each of said valves having a horizontal leg and a vertical leg extending upwardly from one side of the horizontal leg, said horizontal leg having its ends extending outwardly beyond the ends of vertical leg, transversely disposed retaining members connected to the tray and overlapping the ends of the horizontal leg, each of said retaining members having an offset portion above and normally spaced from the adjacent end of the horizontal leg and arranged to limit the upward movement of the floating valve relative to the tray, the horizontal leg of the floating valve normally engaging the tray to close a flow opening and operable upon variation of the differential gas pressure from below the tray to above the same to cause the horizontal leg of the floating valve to be raised relative to said flow opening.

6. In a gas and liquid contact apparatus of the class described, a tray having a row of spaced flow openings, angulated floating pivoted valves for closing said openings, each of said valves having a horizontal leg and a vertical leg extending upwardly from one side of the horizontal leg, said horizontal leg having reduced ends extending outwardly beyond the ends of the vertical leg, transversely disposed retaining members connected to the tray and having substantially inverted U-shaped portions overlapping the reduced ends of the horizontal leg, each U-shaped portion of said retaining members being normally spaced from the adjacent reduced end of the horizontal leg and arranged to limit the upward movement of the respective floating valve relative to the tray, said float valves normally engaging the tray to close the flow openings and operable upon variation of the differential gas pressure from below the tray to above the same to cause the valves to be raised relative to said flow openings.

7. In a gas and liquid contact apparatus of the class described, a tray having spaced transverse rows of flow openings, spaced angulated floating pivoted valves for closing said openings, each of said valves having a horizontal leg and a vertical leg extended upwardly from one side of the horizontal leg so that said side of the horizontal leg is heavier than the opposite side, the ends of each horizontal leg being reduced and extending outwardly beyond the ends of the vertical leg, spaced retaining members above the floating valves and extending transversely thereof, each of said retaining members including a substantially U-shaped intermediate portion having horizontally disposed end flanges extending in opposite directions from the U-shaped portion, means connecting said flanges to a tray, a U-shaped portion of each retaining member coacting with the tray to provide a space into which extend from opposite sides the reduced ends of the horizontal legs of the valves, each of said floating valves normally engaging the tray to close a flow opening and operable upon variation in the differential gas pressure from below the tray to above the same to initially cause the light side of the horizontal leg of each valve to be raised relative to its flow opening and upon increase of the upward differential gas pressure, to move the heavy side of the valve also away from the opening, the upward movement of the sides in said space being limited by engagement of the ends of the horizontal portions of the valves with the underside of the U-shaped portion of the retaining members.

8. In a gas and liquid contact apparatus as called for in claim 7 in which lateral movement of the valves is limited by engagement of the edges of the reduced horizontal end portions of the valves with the vertical sides of the U-shaped portions of the retaining members.

9. In a gas and liquid contact apparatus as called for in claim 7 in which the vertical sides of the U-shaped portion of each of the retaining members are provided with ports for facilitating escape of foreign matter from the space between the retaining member and the tray.

10. In a gas and liquid contact apparatus of the class described, a tray having spaced transverse rows of openings, spaced floating pivoted valves for closing said openings, each of said valves having one side edge heavier than its opposite side edge and provided with reduced ends, spaced retaining members above said valves and extending transversely thereof, each of said retaining members including a substantially U-shaped intermediate portion having horizontally disposed end flanges extending in opposite directions from the U-shaped portion, means connecting said flanges to the tray, the U-shaped portion of each retaining member coacting with the tray to provide a space into which extend from opposite sides the reduced ends of the valves, each of said float valves normally engaging the tray to close a flow opening and operable upon differential gas pressure from below the tray to above the same to cause the valve to be initially tilted and then raised above the flow openings, the upward movement of the sides in said space being limited by engagement of the reduced ends of the valves with the underside of the U-shaped portion of the retaining members and upon increase of the differential gas pressure to permit increased flow of gas through said flow openings.

11. In a gas and liquid contact apparatus as called for in claim 10 in which lateral movement of the valves is limited by engagement of the edges of the reduced end portions of the valves with the vertical sides of the U-shaped portions of the retaining members.

12. In a gas and liquid contact apparatus as called for in claim 10 in which the vertical sides of the U-shaped portions of the retaining members are provided with ports for facilitating escape of any foreign matter that may collect in the space between each of the retaining members and the tray and which would interfere with the free movement of the floating valves.

13. A contact apparatus as called for in claim 1, in which the floating pivoted valve is of substantially L-shape so that one side edge thereof will be heavier than the opposite side edge.

14. In a gas and liquid contact apparatus as called for in claim 6 in which the spaced arms of the U-shaped portion are provided with openings for allowing the escape of gas from the valve.

15. In a contact apparatus of the class described, a tray having a longitudinal flow opening therein, a longitudinal floating pivoted valve above the tray and arranged to close said opening, said valve having one side edge heavier than its opposite side edge, and spaced transverse retaining means for limiting the upward movement of the valve relative to the tray, said valve being operable upon variation of the differential fluid pressure to initially be rocked about the extremity of one edge so as to tilt the opposite edge away from the flow opening and in engagement with the retaining means, said valve upon further increase of the differential fluid pressure having the extremity of its other edge displaced so as to be bodily moved away from said opening and in engagement with said retaining means.

16. In a contact apparatus of the class described, a tray having a longitudinal flow opening therein, a longitudinal floating angulated pivoted valve above the tray and arranged to close said opening, and spaced transverse retaining means for limiting the upward movement of the valve relative to the tray, said retaining means being spaced from the tray a distance less than the width between the side edges of the floating valve, said valve being operable upon variation of the differential fluid pressure from below to above the same to initially be rocked about the extremity of one edge so as to displace the opposite edge away from the flow opening and in engagement with the retaining means, said valve upon further increase of upward pressure having the extremity of its other edge raised so as to be bodily moved away from said opening and in engagement with said retaining means.

17. In a contact apparatus of the class described, a tray having a flow opening therein, a floating pivoted valve above the tray and arranged to cover said opening, retaining means spaced above the tray for limiting upward movement of the valve relative to the tray, said valve being heavier on one edge than on the other edge and operable upon variation in the differential fluid pressure from below the tray to above the same to initally be rocked about the extremity of its heavy edge as an axis so as to raise the opposite light edge upwardly away from the flow opening and in engagement with said retaining means and upon increase of upward differential fluid pressure to be rocked about the extremity of its light edge as an axis so as to raise the opposite heavy edge also upwardly away from the flow opening and in engagement with said retaining means so as to be bodily displaced to the limit of said retaining means from said flow opening, said retaining means being spaced from the tray a distance less than the width between the side edges of the floating valve.

18. In a contact apparatus as called for in claim 17 in which is arranged a transverse row of spaced openings and floating pivoted valves.

19. In a contact apparatus of the class described, a tray having a transverse row of flow openings therein, a row of floating pivoted valves above the tray and arranged to cover groups of said openings, spaced transverse retaining means for limiting transverse, vertical and axial movement of the valves, said valves being heavier on one edge than on the other edge and operable substantially in unison upon variation in the differential fluid pressure from below the tray to above the same to initially be rocked about the extremities of their heavy edges as axes so as to raise the opposite light edges upwardly away from the flow openings and in engagement with said vertical retaining means and upon increase of upward differential fluid pressure to be rocked about the extremities of their light edges as axes so as to raise the opposite heavy edges also upwardly away from the flow openings and in engagement with said retaining means so as to bodily displace said valves to the limit of said retaining means from said flow openings, said retaining means being spaced from the tray a distance less than the width between the side edges of the floating valve.

20. In a contact apparatus of the class described, a tray having a transverse row of flow openings therein, a row of floating pivotal valves above the tray with each of said valves arranged to cover one of said openings, each of said valves having reduced ends extending outwardly beyond the ends of its associated tray opening, transversely disposed retaining members connected to the tray intermediate flow openings and having substantially inverted U-shaped intermediate portions overlapping the reduced ends of the floating pivotal valves, each of said retaining members having horizontally disposed end flanges extending in opposite direction from the U-shaped portion of each intermediate retaining member coacting with the tray to provide a space into which extend from opposite sides the reduced ends of the valves, said retaining members at the ends of row of flow openings coacting with the tray to provide a space into which the reduced outside end of the end valves extend from one side thereinto, each of said floating pivotal valves normally engaging the tray to cover its associated flow opening, said valves being substantially uniform in cross section and heavier on one edge than on the other edge and operable substantially in unison upon variation in the differential fluid pressure from below the tray to above the same to initally be rocked about the extremities of their heavy edges as axes so as to raise the opposite light edges upwardly away from their associated flow openings and in engagement with the underneath side of the U-shaped portions of the retaining members at each end thereof and upon increase of upward differential fluid pressure to be rocked about the extremities of their light edges as axes in engagement with retaining members so as to raise the opposite heavy edges also upwardly away from the flow openings and also in engagement with the underneath side of the U-shaped portions of the retaining members at each end thereof to bodily displace said valves to the limit of said U-shaped portion of retaining members from said flow openings.

21. In a contact apparatus as called for in claim 20 in which is arranged spaced transverse rows of spaced openings and associated floating pivotal valves.

References Cited in the file of this patent

UNITED STATES PATENTS

| | | |
|---|---|---|
| 1,609,924 | Witman | Dec. 7, 1926 |
| 1,663,737 | Thompson | Mar. 27, 1928 |
| 1,756,060 | Hawks | Apr. 29, 1930 |
| 1,910,237 | Cadwell | May 23, 1933 |

FOREIGN PATENTS

| | | |
|---|---|---|
| 909,576 | France | 1946 |